United States Patent
Waddleton

(10) Patent No.: US 11,124,312 B2
(45) Date of Patent: Sep. 21, 2021

(54) AIRCRAFT MOTIVE FLOW LINE

(71) Applicant: PRATT & WHITNEY CANADA CORP., Longueuil (CA)

(72) Inventor: David Waddleton, Candiac (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 27 days.

(21) Appl. No.: 16/704,281

(22) Filed: Dec. 5, 2019

(65) Prior Publication Data

US 2020/0331623 A1    Oct. 22, 2020

Related U.S. Application Data

(60) Provisional application No. 62/834,527, filed on Apr. 16, 2019.

(51) Int. Cl.
| | |
|---|---|
| *F16L 9/18* | (2006.01) |
| *B64D 37/00* | (2006.01) |
| *B64D 41/00* | (2006.01) |

(52) U.S. Cl.
CPC .......... *B64D 37/005* (2013.01); *B64D 41/00* (2013.01); *F16L 9/18* (2013.01)

(58) Field of Classification Search
CPC .... F16L 9/18; F16L 9/14; F16L 55/05; B64D 37/005; B64D 41/00
USPC .............................. 138/112–114, 148, 26, 30
See application file for complete search history.

(56) References Cited

U.S. PATENT DOCUMENTS

| | | | | |
|---|---|---|---|---|
| 913,136 | A * | 2/1909 | Ford | A63H 19/10 |
| | | | | 105/54 |
| 3,165,123 | A * | 1/1965 | Hawkins | F15D 1/065 |
| | | | | 138/37 |
| 4,611,633 | A * | 9/1986 | Buchholz | F16L 55/045 |
| | | | | 138/26 |
| 4,794,955 | A * | 1/1989 | Ejima | F16L 55/05 |
| | | | | 138/30 |
| 5,172,729 | A * | 12/1992 | Vantellini | F16L 55/04 |
| | | | | 138/26 |
| 5,437,311 | A | 8/1995 | Reynolds | |
| 5,964,251 | A | 10/1999 | Reynolds et al. | |
| 6,155,378 | A * | 12/2000 | Qatu | B60H 1/00571 |
| | | | | 138/113 |
| 6,269,841 | B1 * | 8/2001 | Chen | B62D 5/062 |
| | | | | 138/30 |
| 6,360,777 | B1 * | 3/2002 | Bae | F02M 55/04 |
| | | | | 138/129 |
| 7,717,135 | B2 * | 5/2010 | Chen | F16L 55/052 |
| | | | | 138/30 |
| 2002/0069921 | A1 * | 6/2002 | Zanardi | F16L 55/02763 |
| | | | | 138/30 |

(Continued)

*Primary Examiner* — Patrick F Brinson
(74) *Attorney, Agent, or Firm* — Norton Rose Fulbright Canada LLP

(57) ABSTRACT

An aircraft motive flow line includes an outer tube made out of a first material and an inner tube extending longitudinally inside the outer tube. The inner tube is made out of a second material having a thermal conductivity coefficient lower than that of the first material. The first material has a strength coefficient greater than that of the second material. The inner tube is sized and held in position relative to the outer tube so as to define a gap between an exterior of the inner tube and an interior of the outer tube. A port fluidly connects an interior of the inner tube to the gap.

17 Claims, 1 Drawing Sheet

(56) References Cited

U.S. PATENT DOCUMENTS

2006/0243335 A1* 11/2006 Krieger ................ F15B 21/008
                                                                                 138/30
2017/0267368 A1    9/2017  Hara et al.

* cited by examiner

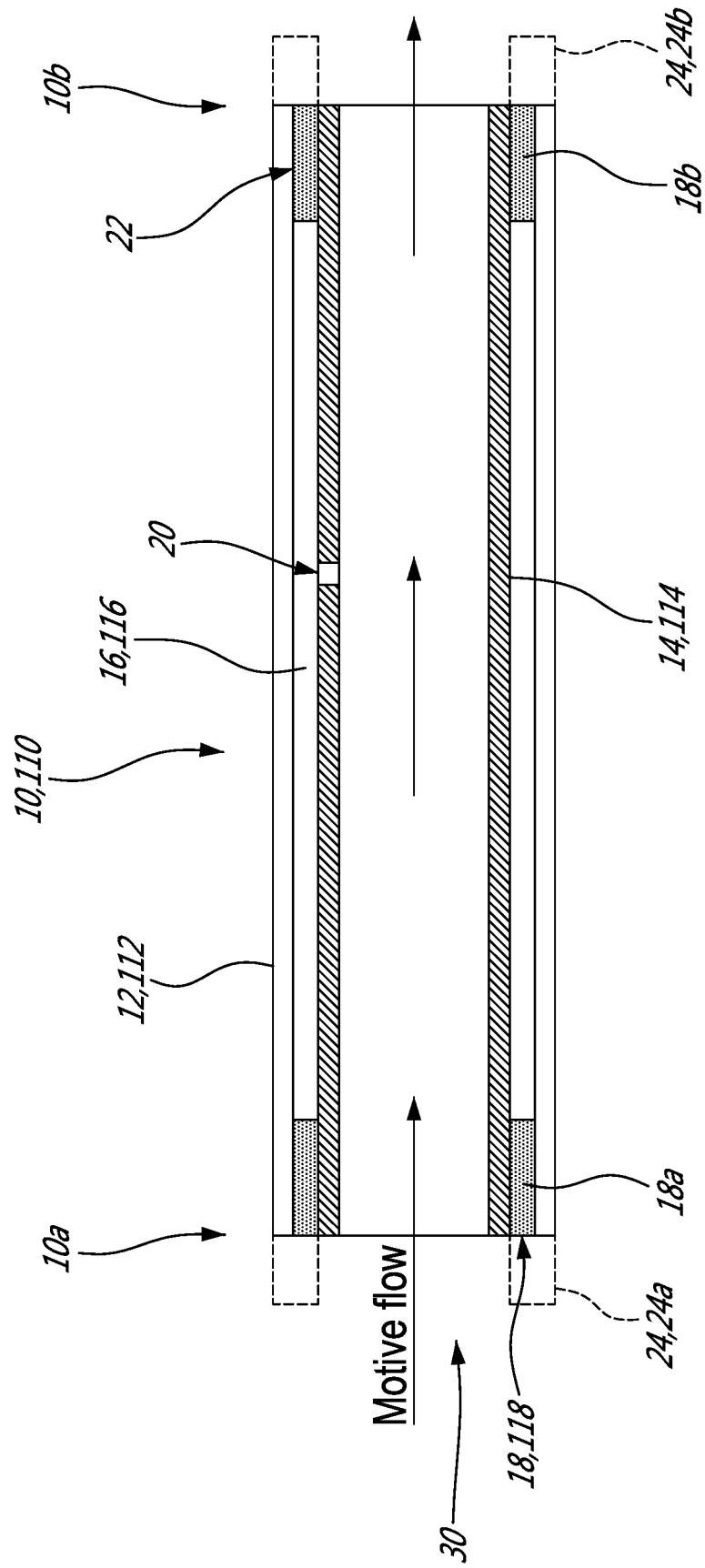

AIRCRAFT MOTIVE FLOW LINE

CROSS-REFERENCE TO RELATED APPLICATIONS

This application claims priority to U.S. provisional patent application No. 62/834,527 filed Apr. 16, 2019, the entire contents of which are incorporated by reference herein.

TECHNICAL FIELD

The application relates generally to aircraft engines and auxiliary systems related thereto, and in particular to aircraft motive flow lines powered by aircraft engines.

BACKGROUND OF THE ART

Aircraft equipped are typically equipped with several fuel tanks. In view of operational considerations related to aerodynamics, cargo storage capacity or passenger seating capacity, among others, such tanks may be remote from the engines. Thus, flow lines are conventionally provided for routing fuel from upstream tanks to downstream tanks of the aircraft, for example from a tank located in a fuselage to an engine collector tank located in a wing. An auxiliary power mode of the engine, motive flow, may be used to pressurize a given fuel line connected between the collector tank and the fuel inlet port of the engine or for lines inter-connecting tanks (fuel transfer lines). Under certain conditions, the injection of the motive flow assists in inducing a flow of fuel from the given upstream tank to a given downstream location connected thereto. The rate at which fuel flow may be induced may be affected by various in-flight conditions such as environmental temperatures as well as aircraft altitude, motive flow pressure and flow rate. In some aircraft installations, the distance between the engine and injection point of motive flow may result in the temperature of the motive flow dropping below the freezing point of water which may be contained within the motive flow stream. As such, blockage of the motive flow line due to ice accumulation at or upstream of the injection point may occur. Improvements to aircraft flow lines are therefore desirable.

SUMMARY

In accordance with a general aspect, there is provided: an aircraft motive flow line comprising: an outer tube made out of a first material; an inner tube extending longitudinally inside the outer tube, the inner tube being made out of a second material having a thermal conductivity coefficient lower than that of the first material, the first material having a strength coefficient greater than that of the second material, the inner tube being sized and held in position relative to the outer tube so as to define a gap between an exterior of the inner tube and an interior of the outer tube; and a port fluidly connecting an interior of the inner tube to the gap.

In accordance with another aspect, there is provided a flow regulation system for an outer tube of an aircraft motive flow line, the flow regulation system comprising: an inner tube including a port fluidly connecting an interior of the inner tube to an exterior of the inner tube, the inner tube being configured with respect to an outer tube of the aircraft motive flow line, such that the inner tube is positionable inside the outer tube to form a gap located therebetween and fluidly connected to the port and; the inner tube is made out of an inner-tube material having a strength coefficient, a thermal conductivity coefficient and a friction coefficient being lesser than that of an outer-tube material out of which the outer tube is made.

In accordance with a still further aspect, there is provided a method of regulating a flow for an aircraft motive flow line, the method comprising: obtaining an outer tube of the aircraft motive flow line, the outer tube having an inlet fluidly connectable to a power unit of the aircraft motive flow line; positioning an inner tube inside the outer tube, the inner tube being configured with respect to the outer tube such that the inner tube is positionable inside the outer tube so as to form a gap therebetween to thermally insulate an interior of the inner tube relative to an exterior of the outer tube, the gap in fluid connection with the interior of the inner tube via a port of the inner tube; and fluidly connecting the inner tube to the power unit.

DRAWING

FIG. 1 is a schematic cross-sectional view of an aircraft flow line.

DETAILED DESCRIPTION

FIG. 1 illustrates an aircraft flow line 10 provided for use in an aircraft equipped with a power plant (not shown) fitted with a motive flow system and, as such, may be said to be an aircraft motive flow line 10. The line 10 includes features providing it with flow regulating characteristics which will be described hereinbelow. The power plant may comprise an auxiliary power unit (APU) operatively connected to the flow line 10. Both the APU and the flow line 10 form a part of the motive flow system. An outlet 10b of the flow line 10 located opposite the inlet 10a fluidly connects the flow line 10 to a fuel tank of the aircraft (not shown). A motive flow runs between the inlet 10a and the outlet 10b. Among contemplated alternative applications, the flow line 10 may be provided for use as a fluid connection between two fuel tanks of the aircraft or between a fuel tank and the fuel inlet port of an auxiliary power unit of an aircraft.

The structure of the flow line 10 will now be generally described. The flow line 10 comprises an outer tube 12 and an inner tube 14. The inner tube 14 extends longitudinally inside the outer tube 12. The outer tube 12 and the inner tube 14 are sized with respect to one another so as to achieve a clearance fit there_between, i.e., the inner tube 14 is fitted inside the outer tube 12 so as to define an annular gap 16 (i.e., a clearance 16) between an exterior of the inner tube 14 and an interior of the outer tube 12. A spacer 18 (i.e., an alignment feature 18) forms an interface between the outer tube 12 and the inner tube 14. The spacer 18 extends inside the gap 6 and around the inner tube 14 so as to hold the inner tube 14 in position relative to the outer tube 12. This may be used where the flow line 10 interfaces with a similar flow line either upstream or downstream and the discontinuity of the flow stream within the inner tube 14 at the interface has to be minimized. The inner tube 14 is provided with a port or ports 20, i.e., a fluid connection(s) between an interior of the inner tube 14 and the exterior of the inner tube 14. The port 20 fluidly connects the interior of the inner tube 14 to the gap 16.

In the illustrated example, the outer tube 12 and the inner tube 14 are both cylindrical in shape. An outer diameter of the inner tube 14 is smaller than an inner diameter of the outer tube 12. The inner tube 14 is positioned inside the outer tube 12 so as to be generally coaxial therewith. As such, the gap 16 may be said to circumferentially surround the inner tube 14.

The spacer 18 interfaces with the inner tube 14 at either ends of the flow line 10, proximate the inlet 10a and the outlet 10b. It should be understood, however, that the spacer 18 may interface with the inner tube 14 at other locations along the span of the flow line 10. In this case, the spacer 18 includes annular bushings 18a, 18b spaced along the inner tube 14 and extending radially across the gap 16. More specifically, the inner tube 14 is held in position at its ends by an upstream bushing 18a and a downstream bushing 18b. The gap 16 extends longitudinally along the inner tube 14 between the upstream bushing 18a and the downstream bushing 18b. The port 20 is disposed between the bushings 18a, 18b such that passage between the interior of the inner tube 14 and the gap 16 is unhindered.

The bushings 18a, 18b support the inner tube 14 such that a bridging portion of the inner tube 14 extending therebetween follows a rectilinear shape of the outer tube 12 as it bridges the gap 16. In other embodiments, the spacer 18 may have other suitable structural arrangements suitable for supporting the inner tube 14 such that bridging portions of the inner tube 14 follow sections of the outer tube 12 having other spans and shapes. For example, various distributions of bushings 18a, 18b are contemplated, including distributions of more than two bushings 18a, 18b and distributions of bushings having different sizes. A port 20 may be provided between any two successive bushings.

In FIG. 1, fittings 24 (i.e., end pieces) are disposed adjacent the bushings 18a, 18b. An upstream fitting 24a disposed upstream of the flow line 10 may provide the flow line 10 with a seal between the outer tube 12 and the inner tube 14. The upstream fitting 24a may also form the inlet 10a, collecting the motive flow 10c from an outlet of the auxiliary power unit of the engine and channelling the motive flow 10c into the inner tube 14. A downstream fitting 24b disposed downstream of the flow line may form the outlet 10b, channelling the motive flow 10c away from the inner tube 14. In some embodiments, a given spacer 18 and a given fitting 24 may form a unitary piece.

Also, the outer tube 12 and the inner tube 14 are coextensive. In other embodiments, the outer tube 12 and the inner tube 14 may respectively have different lengths. For instance, the inner tube 14 may be constructed of a plurality of inner tube segments fitted inside a single outer tube 12. In some such embodiments, the inner tube segments may be fluidly interconnected by segment fittings. In other embodiments, the outer tube 12 may be constructed of a plurality of outer tube segments fitted with a single inner tube 14. A port 20 may be provided between any two successive fittings.

The flow regulating characteristics of the flow line 10 will now be described more specifically. The outer tube 12 is made out of a material having a high mechanical strength coefficient, for instance in terms of ultimate strength. The material of the outer tube 12 may be suitable to withstand stresses caused by, for example, temperature variations (e.g., from below 0 C at portions of the outer tube 12 running between the fuselage and the wing to substantially higher temperatures at portions closer to the proximate the engine) or exposure to fire. Stresses may also be caused by external loads, such as vibrations and impacts, which may be imparted to the outer tube 12 during maintenance or operation of the aircraft. Suitable materials for making the outer tube 12 include various metals such as steel. The material of the outer tube 12 may also exhibit a suitable level of plasticity such that the outer tube 12 may be shaped to follow passages defined within the aircraft between tanks. As such, the flow regulating characteristics of the flow line 10 may be said to include mechanical protection.

The inner tube 14 is made out of a material having a thermal conductivity coefficient being lower than that of the material of the outer tube 12. For example, the inner tube 14 may be made of polytetrafluoroethylene (PTFE). The inner tube 14 is arranged relative to the outer tube 12 so as to provide the interior of the inner tube 14 with a first thermal insulation layer with respect to the exterior of the outer tube 12. Also, the inner tube 14 and the spacer 18 are arranged relative to the outer tube 12 to provide the interior of the inner tube 14 with a second insulation layer via the gap 16. As such, the flow regulating characteristics of the flow line 10 may be said to include thermal insulation.

Either one or both of the inner tube 14 and the spacer 18 may be provided with a damper 22 suitable for vibratively insulating the interior of the inner tube 14 with respect to the outer tube 12. In some embodiments, the damper 22 may have a friction coefficient lesser than the material of the outer tube 12, the inner tube 14 and the spacer 18. In some such embodiments, the damper 22 may have a damping coefficient greater than the material of the outer tube 12. In some embodiments, the damper 22 may form a unitary piece with either one of the inner tube 14 and the spacer 18. The damper 22 may also be a fluid, such as grease installed in the gap 16. As such, the flow regulating characteristics of the flow line 10 may be said to include vibrational insulation.

The port 20 may be said to assist in protecting the inner tube 14 from being radially overstressed, for example due to pressures imparted by the motive flow in excess of its pressure rating. Indeed, the port 20 is arranged to inhibit differential pressure buildup across the wall of the inner tube 14 by distributing imparted pressure on either sides of the wall. As such, a pressure inside the gap 16 may increase as a pressure inside the inner tube 14 increases. The port 20 can adopt various forms suitable for distributing pressure across the inner tube 14, such as a permeable membrane, a split line along the axis of the inner tube 14, a valve and perforations. In some embodiments, the port 20 is a relief valve arranged for allowing a portion of the motive flow 10c to exit the inner tube 14 therethrough upon pressurizing the interior of the inner tube 14 upward of a rated pressure value. As such, the flow regulating characteristics of the flow line 10 may be said to include pressure distribution.

The material of the inner tube 14 may also have a friction coefficient deemed suitable for interfacing with the motive flow 10c and even for promoting the motive flow 10c in view of friction coefficients of other materials typically used in the art. As such, the flow regulating characteristics of the flow line 10 may be said to include flow promotion.

The outer tube 12, the inner tube 14 and the spacer 18 may be manufactured by various suitable methods such as extrusion, 3D printing or molding. The spacer 18 may be joined to the inner tube 14 by various suitable means, for instance via chemical bonding, clamping, overmolding, threading or even brazing. In the illustrated example, the inner tube 14 and the port 20 form a unitary piece. The port 20 is a perforation defined across the wall of the inner tube 14. Alternatively, other types of ports 20 forming components distinct from the inner tube 14 may be joined to the inner tube 14 by suitable means among the above-mentioned ones.

In some embodiments, the spacer 18 may be sized with respect to the outer tube 12 and the inner tube 14 so as to provide various degrees of resistance to sliding relative to the outer tube 12. The spacer 18 may also be arranged to be slidable with the inner tube 14 relative to the outer tube 12 to allow removal of the inner tube 14 from the outer tube 12, should the need arise.

Still with reference to FIG. 1 and now with respect to another aspect of the present disclosure, there is provided a flow regulation system 30 for use in an existing flow line 110 of an aircraft, in this case a motive flow line 110. The flow regulation system 30 is configured to be insertable inside an existing outer tube 112 of the existing flow line 110. The flow regulation system 30 includes an inner tube 114 and a spacer 118 configured with respect to an interior of the existing outer tube 112 so as to define a gap 116. As the aforementioned elements of the flow regulation system 30 are analogous to elements of the flow line 10, their description will not be repeated for brevity.

According to a further aspect of the present disclosure, there is provided a method of regulating a flow of an aircraft motive flow line such as the existing flow line 110. Indeed, it should be noted that under certain conditions, retrofitting the existing flow line 110 with the flow regulation system 30 may desirably assist in regulating the motive flow 10*c* running through the existing flow line 110 so as to attain desired values for certain flow properties (e.g., flow temperature, flow pressure and flow rate) between the engine and the point of use. More specifically, regulating the motive flow 10*c* may be desirable in critical portions of the existing flow line 110 that are otherwise prone to flow disturbing conditions such as, for example, temperature variations, vibrations, pressure buildup and frictional losses. Under certain circumstances, the method provides a means for insulating the existing flow line 110 from temperatures which may otherwise cause icing of the fluid running therein and undesirably affect its flow rate.

In some embodiments, the method comprises positioning the inner tube 114 within the outer tube 112 so as to define the gap 116. In contrast to running the motive flow 10*c* within the outer tube 112, running the motive flow 10*c* within the inner tube 114 instead may increase the flow rate due to the smaller diameter of the inner tube 114. Increasing the flow rate may also reduce the residency time of the fluid within the flow line 110 and thereby mitigate heat loss therefrom and/or icing thereof. Heat loss is further mitigated in comparison to running the motive flow 10*c* within the outer tube 114 due to the thermal insulation provided by the flow regulation system 30.

In the illustrated embodiment, the spacer 118 is joined to the inner tube 114 so as to be slidable inside the existing outer tube 112 together with the inner tube 114. The method may thus comprise positioning the spacer 118 together with the inner tube 114 inside the outer tube 112. Also, in other embodiments in which the spacer 118 is provided separate from the inner tube 114, the method may comprise inserting the spacer 118 in the gap 116 upon positioning the inner tube 114 inside the outer tube 112.

The method may further comprise, in some embodiments, disconnecting an end of the existing flow line 110. The end may be an inlet of the existing outer tube 112 or an outlet of the existing outer tube 112. In the case of an existing outer tube 112 having a modular construction, the end may also be a segment end of the outer tube 112. In some such embodiments, the method may further comprise fitting the flow regulation system 30 within the existing flow line 110 via the end after disconnecting it. The end may even be defined upon cutting the existing outer tube 112.

Also, the method may comprise inserting a damper 22 inside the gap 116 so as to vibratively insulate the inner tube 114. In some such embodiments, the damper 22 may be a fluid, such as grease, that may be applied either to the interior of the outer tube 112, to an exterior of the inner tube 114 or to an exterior of the spacer 118. Under certain circumstances, applying the damper 22 prior to inserting the inner tube 114 inside the outer tube 112 may facilitate the insertion of the inner tube 114. inserting the damper 22 in the gap 116

Upon positioning the inner tube 114 inside the outer tube 112, the method provides fluidly connecting the inner tube 114 to the power unit. In some embodiments, the method may also comprise sealing off the inlet of the outer tube 112 relative to the inlet of the inner tube 114 and to the power unit. As such, the motive flow 10*c* may be injected directly from the power unit to inside the inner tube 114. In some such embodiments, the method may also comprise fluidly connecting an outlet of the inner tube 114 to a fuel tank such that the motive flow 10*c* may be injected directly from the inner tube 114 to inside the tank.

The above description is meant to be exemplary only, and one skilled in the art will recognize that changes may be made to the embodiments described without departing from the scope of the invention disclosed. For example, such changes may pertain to engine types, to fuel tank types and placement, to fuel line materials and shapes as well as to fuel types. Still other modifications which fall within the scope of the present invention will be apparent to those skilled in the art, in light of a review of this disclosure, and such modifications are intended to fall within the appended claims.

The invention claimed is:

1. An aircraft motive flow line comprising:
an outer tube made out of a first material;
an inner tube extending longitudinally inside the outer tube, the inner tube being made out of a second material having a thermal conductivity coefficient lower than that of the first material, the first material having a strength coefficient greater than that of the second material, the inner tube being sized and held in position relative to the outer tube so as to define a gap between an exterior of the inner tube and an interior of the outer tube;
a port fluidly connecting an interior of the inner tube to the gap; and
an annular spacer disposed outside the inner tube in the gap, the annular spacer arranged to be slidable together with the inner tube relative to the outer tube.

2. The aircraft motive flow line of claim 1, wherein the port is configured to relieve the interior of the inner tube from a pressure in excess of a given pressure value.

3. The aircraft motive flow line of claim 2, wherein the inner tube and the port form a unitary piece, the port consisting of at least one perforation extending between the interior of the inner tube and the exterior thereof.

4. The aircraft motive flow line of claim 2, wherein the annular spacer comprises a pair of axially spaced-apart annular bushings received in the gap and holding the inner tube in position relative to the outer tube, the inner tube surrounded by an innermost diameter surface of the annular bushings.

5. The aircraft motive flow line of claim 4, further comprising a fitting configured to be fluidly connectable between the inner tube and a power unit of the aircraft motive flow line, the fitting separate from the pair of annular bushings.

6. The aircraft motive flow line of claim 5, wherein the fitting seals an outlet of the outer tube relative to the inner tube.

7. The aircraft motive flow line of claim 1, further comprising a damper received in the gap to vibratively insulate the inner tube with respect to the outer tube.

8. The aircraft motive flow line of claim 7, wherein the damper is made out of a material having a friction coefficient lower than that of the first material.

9. The aircraft motive flow line of claim 1, wherein the second material has a friction coefficient lower than that of the first material.

10. A flow regulation system for an outer tube of an aircraft motive flow line, the flow regulation system comprising:
    an inner tube including a port fluidly connecting an interior of the inner tube to an exterior of the inner tube, the inner tube being configured with respect to an outer tube of the aircraft motive flow line, such that:
        the inner tube is positionable inside the outer tube to form a gap located therebetween and fluidly connected to the port; and
        the inner tube is made out of an inner-tube material having a strength coefficient, a thermal conductivity coefficient and a friction coefficient being lesser than that of an outer-tube material out of which the outer tube is made; and
    a spacer joined to the inner tube so as to be slidable inside the outer tube together with the inner tube.

11. The flow regulation system of claim 10, wherein upon forming the gap between the inner tube and the outer tube, pressurizing the interior of the inner tube up to a given pressure value pressurizes an exterior of the inner tube contiguous with the port up to the given pressure value via the port.

12. The flow regulation system of claim 11, wherein the inner tube and the port form a unitary piece, the port consisting of at least one perforation extending between the interior of the inner tube and the exterior thereof.

13. The flow regulation system of claim 11, wherein the spacer comprises a pair of annular bushings axially spaced along the inner tube.

14. The flow regulation system of claim 13, further comprising a fitting:
    configured to be connectable between a power unit of the aircraft motive flow line and the inner tube to form a fluid connection therebetween; and
    configured to be connectable between an inlet of the outer tube and the inner tube form a seal therebetween, the fitting being separate from the pair of annular bushings and disposed on an outboard side thereof relative to an axial extent of the outer tube.

15. A method of regulating a flow for an aircraft motive flow line, the method comprising:
    obtaining an outer tube of the aircraft motive flow line, the outer tube having an inlet fluidly connectable to a power unit of the aircraft motive flow line;
    positioning an inner tube inside the outer tube, the inner tube being configured with respect to the outer tube such that the inner tube is positionable inside the outer tube so as to form a gap therebetween to thermally insulate an interior of the inner tube relative to an exterior of the outer tube, the gap in fluid connection with the interior of the inner tube via a port of the inner tube, wherein the positioning the inner tube relative to the outer tube includes: joining the inner tube to an annular spacer, and slidably inserting the inner tube together with the annular spacer inside the outer tube; and
    fluidly connecting the inner tube to the power unit.

16. The method of claim 15, further comprising vibratively insulating the inner tube with respect to the outer tube by inserting a damper in the gap.

17. The method of claim 15, further comprising sealing off the inlet of the outer tube relative to the exterior of the inner tube.

\* \* \* \* \*